(12) United States Patent
Fujiwara

(10) Patent No.: US 11,240,419 B2
(45) Date of Patent: Feb. 1, 2022

(54) ELECTRONIC DEVICE THAT CAN EXECUTE FUNCTION IN ACCORDANCE WITH LINE OF SIGHT OF USER, METHOD OF CONTROLLING ELECTRONIC DEVICE, AND NON-TRANSITORY COMPUTER READABLE MEDIUM

(71) Applicant: CANON KABUSHIKI KAISHA, Tokyo (JP)

(72) Inventor: Shogo Fujiwara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 16/882,708

(22) Filed: May 25, 2020

(65) Prior Publication Data
US 2020/0382693 A1    Dec. 3, 2020

(30) Foreign Application Priority Data

May 29, 2019 (JP) .............................. JP2019-100195

(51) Int. Cl.
*H04N 5/232* (2006.01)
*G06F 3/01* (2006.01)

(52) U.S. Cl.
CPC ......... *H04N 5/23212* (2013.01); *G06F 3/013* (2013.01); *H04N 5/232933* (2018.08); *H04N 5/232939* (2018.08)

(58) Field of Classification Search
CPC ........ G02B 27/0172; G02B 2027/0178; G02B 23/0093; G02B 27/0179; G06F 3/013; G06F 3/04845; G06F 3/04817; G06F 3/017; G06F 3/0412; G06F 3/016; G06K 9/00238; G06K 9/00617; G06T 11/001
USPC .............................. 345/633; 348/47, 333.03
See application file for complete search history.

(56) References Cited

U.S. PATENT DOCUMENTS

2016/0004306 A1* 1/2016 Marltz .................... G06F 3/013

FOREIGN PATENT DOCUMENTS

JP           2009-251658 A      10/2009

* cited by examiner

*Primary Examiner* — Xi Wang
(74) *Attorney, Agent, or Firm* — Cowan, Liebowitz & Latman, P.C.

(57) ABSTRACT

An electronic device comprising: a line-of-sight detection unit configured to detect a viewed position of a user; and a control unit configured to perform control such that, 1) in a first operation mode, a first function corresponding to a fact that there is gazing is executed in accordance with a state in which a first condition is satisfied, and 2) in a second operation mode, a second function corresponding to a fact that there is gazing is executed in accordance with a state in which a second condition is satisfied, wherein the first condition is a condition regarding the viewed position representing a fact that the user has been gazing for a first period, the second condition is a condition regarding the viewed position representing a fact that the user has been gazing for a second period longer than the first period.

26 Claims, 9 Drawing Sheets

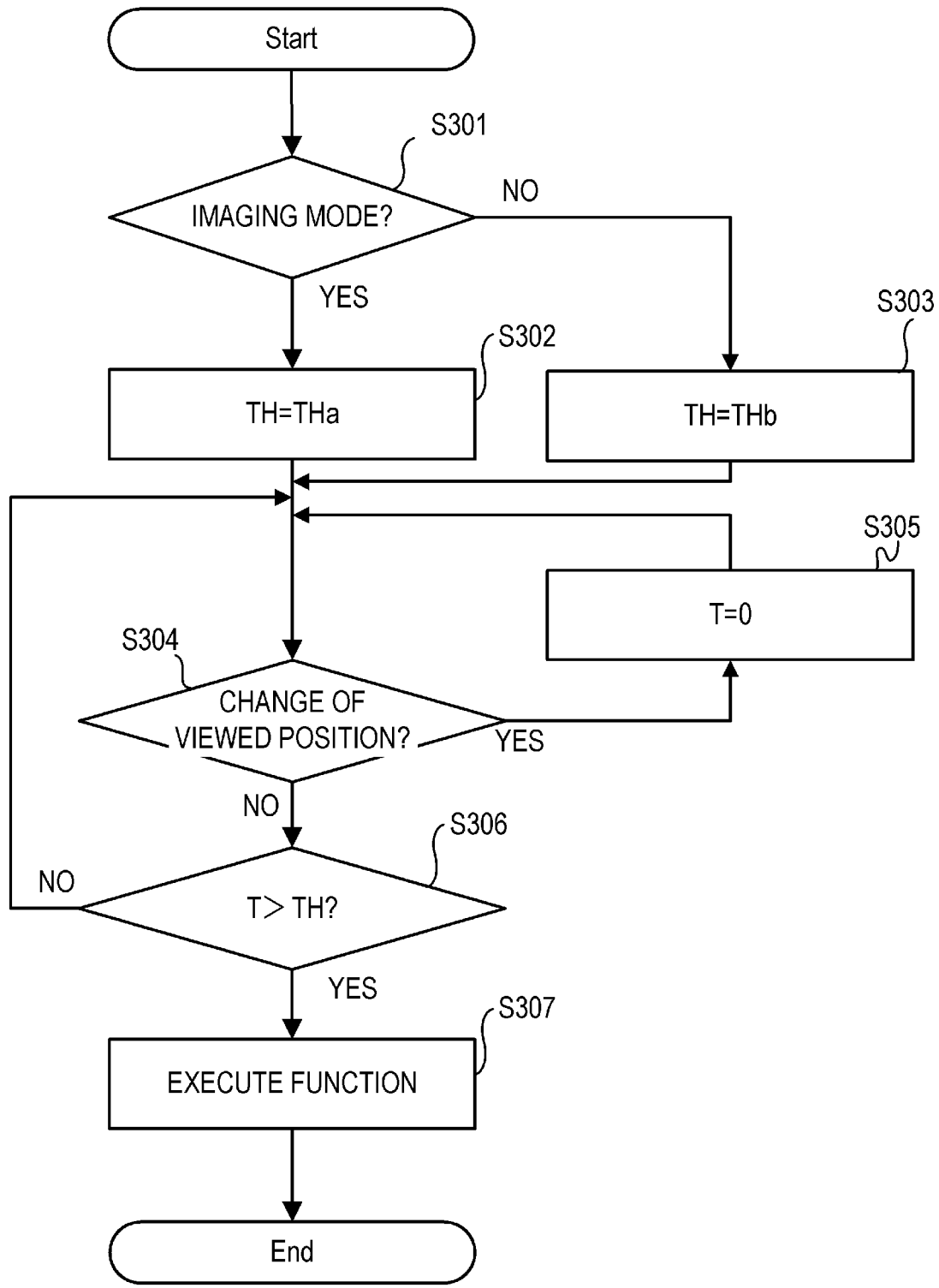

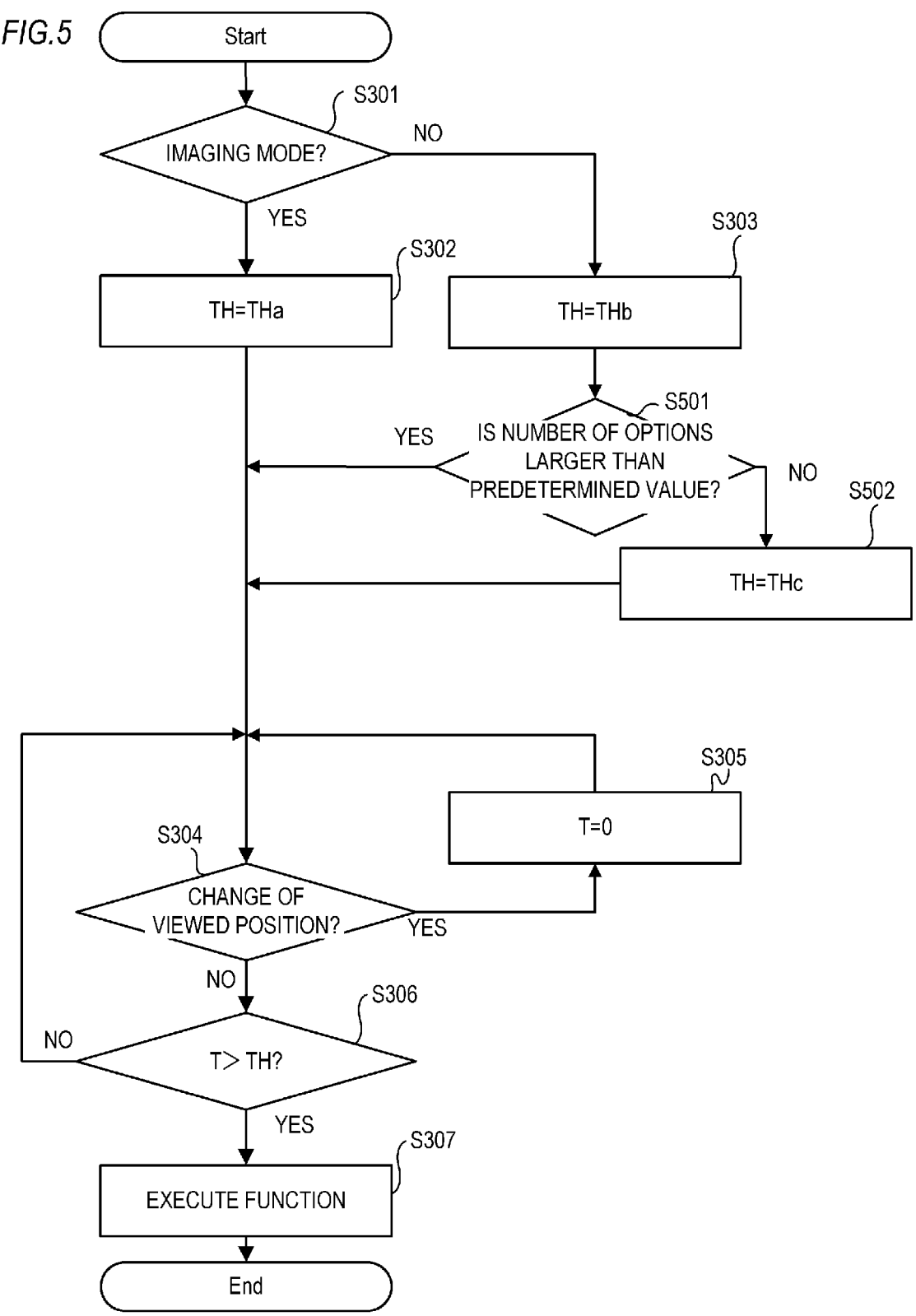

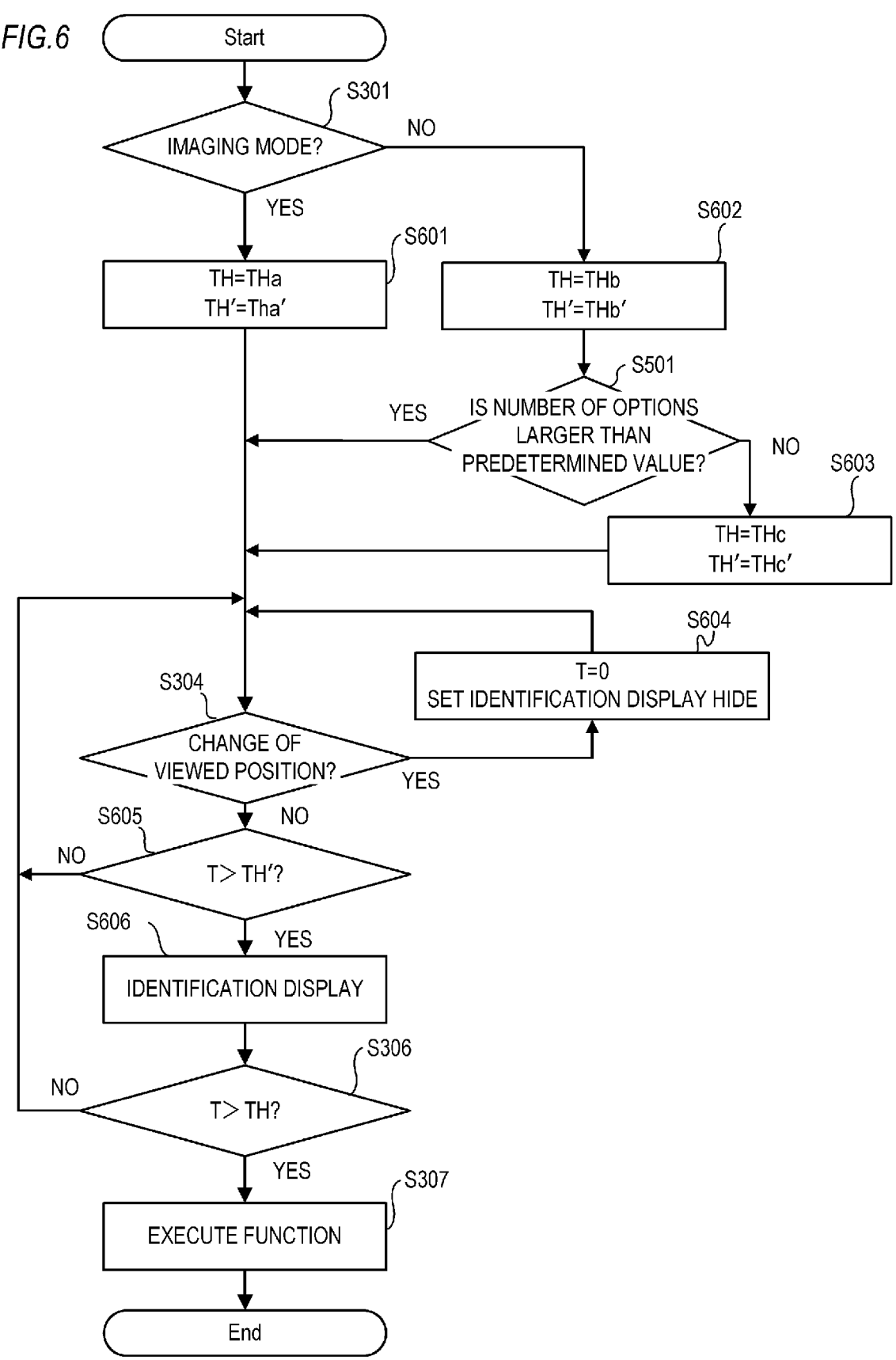

ELECTRONIC DEVICE THAT CAN EXECUTE FUNCTION IN ACCORDANCE WITH LINE OF SIGHT OF USER, METHOD OF CONTROLLING ELECTRONIC DEVICE, AND NON-TRANSITORY COMPUTER READABLE MEDIUM

BACKGROUND OF THE INVENTION

Field of the Invention

The present invention relates to an electronic device that can execute a function in accordance with a line of sight of a user, a method of controlling an electronic device, and a non-transitory computer readable medium.

Description of the Related Art

Conventionally, electronic devices such as cameras, in which an area (a position) observed by a user in a field of view of a finder is detected by detecting a direction of a line of sight of the user to control various photographing functions such as automatic focus adjustment and automatic exposure, have been proposed.

Japanese Patent Application Publication No. 2009-251658 discloses a technique of a display device in which, when a period in which a line of sight of a user is fixed in a certain area exceeds a predetermined threshold, it is determined that the user is gazing at the area and a function corresponding to the gazing is performed.

However, in the technique according to Japanese Patent Application Publication No. 2009-251658, the period until it is determined that the user is gazing (hereinafter, referred to as a gazing determination period) is always constant.

Therefore, when the gazing determination period is too long, the function of an electronic device may not be executed at a timing intended by the user due to a time lag from an input of the line of sight to the gazing determination. On the other hand, when the gazing determination period is too short, the function of the electronic device may be executed before the user intends.

SUMMARY OF THE INVENTION

The present invention in its an aspect provides an electronic device that can execute a function in accordance with a line of sight of a user at a more appropriate timing.

An aspect of the invention is:
an electronic device comprising at least one memory and at least one processor which function as:
a line-of-sight detection unit configured to detect a viewed position of a user; and
a control unit configured to perform control such that, 1) in a first operation mode, a first function corresponding to a fact that there is gazing is executed in accordance with a state in which a first condition is satisfied in the line-of-sight detection unit, and 2) in a second operation mode, a second function corresponding to a fact that there is gazing is executed in accordance with a state in which a second condition is satisfied in the line-of-sight detection unit, wherein
the first condition is a condition regarding the viewed position representing a fact that the user has been gazing for a first period,
the second condition is a condition regarding the viewed position representing a fact that the user has been gazing for a second period longer than the first period.

Further features of the present invention will become apparent from the following description of exemplary embodiments with reference to the attached drawings.

BRIEF DESCRIPTION OF THE DRAWINGS

FIG. 3 is a flowchart showing a process of executing a function in accordance with a line of sight according to the first embodiment;

FIG. 5 is a flowchart showing a process of executing a function in accordance with a line of sight according to a second embodiment;

FIG. 6 is a flowchart showing a process of executing a function in accordance with a line of sight according to a third embodiment;

DESCRIPTION OF THE EMBODIMENTS

First Embodiment

<External View of Digital Camera 100>

Figure 1A:
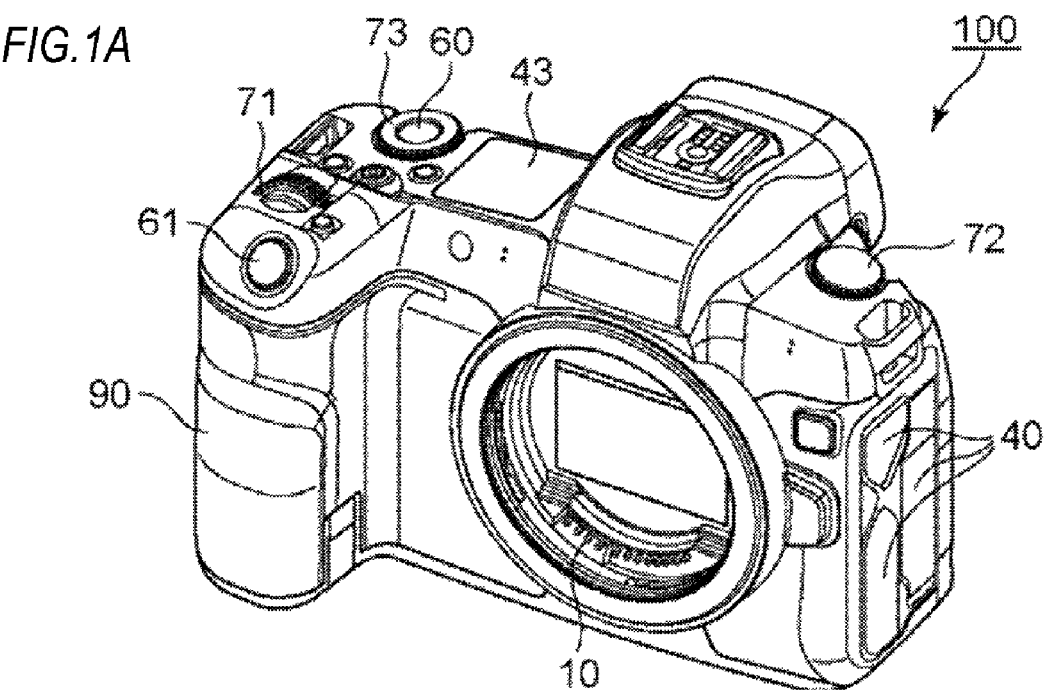
FIGS. 1A and 1B are external views of a digital camera according to a first embodiment.
Figure 1B:
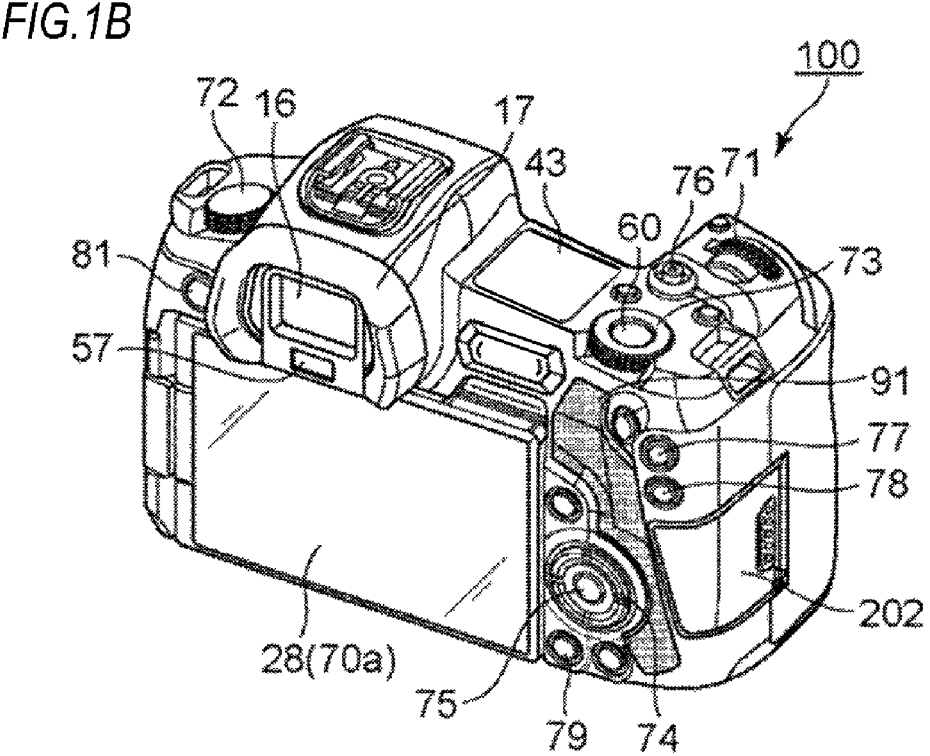

Hereinafter, preferred embodiments of the present invention will be described with reference to the figures. FIGS. 1A and 1B are external views of a digital camera 100 as an example of a device to which the present invention can be applied. FIG. 1A is a front perspective view of the digital camera 100, and FIG. 1B is a rear perspective view of the digital camera 100.

A display unit 28 is a display unit provided on a back surface of the digital camera 100 and displays images and various information. A touch panel 70a can detect a touch operation on a display surface (a touch operation surface) of the display unit 28. A finder outside display unit 43 is a display unit provided on an upper surface of the digital camera 100 and displays various setting values of the digital camera 100 such as a shutter speed and an aperture. A shutter button 61 is an operation member for giving an imaging instruction. A mode switch 60 is an operation member for switching between various modes. A terminal cover 40 is a cover that protects a connector (not shown) for connecting the digital camera 100 to an external device.

A main electronic dial 71 is a rotary operation member, and by turning the main electronic dial 71, the setting values such as the shutter speed and the aperture can be changed. A power switch 72 is an operation member for switching between power ON and OFF of the digital camera 100. A sub electronic dial 73 is a rotary operation member, and by turning the sub electronic dial 73, movement of a selection frame (a cursor), transmission of images, and the like can be performed. A four-way key 74 is configured such that upper, lower, left, and right portions thereof can be pressed, and can perform processing corresponding to a pressed portion of the four-way key 74. A SET button 75 is a push button and is mainly used to determine a selected item.

A video button 76 is used to start or stop video shooting (recording). An AE lock button 77 is a push button and an exposure state can be fixed by pressing the AE lock button 77 in an imaging standby state. An enlargement button 78 is an operation button for switching between ON and OFF of an enlargement mode in a live view display (LV display) of an imaging mode. By operating the main electronic dial 71 after turning on the enlargement mode, the live view image (LV image) can be enlarged or reduced. In a reproduction mode, the enlargement button 78 functions as an operation button for enlarging a reproduction image and increasing an enlargement ratio thereof. A reproduction button 79 is an operation button for switching between the imaging mode and the reproduction mode. By pressing the reproduction button 79 during the imaging mode, the mode is changed to the reproduction mode, and a latest image among images recorded on a recording medium 200 (which will be described later) can be displayed on the display unit 28. A menu button 81 is a push button used for performing an instruction operation for displaying a menu screen, and when the menu button 81 is pressed, the menu screen on which various settings can be made is displayed on the display unit 28. A user can intuitively perform various settings using the menu screen displayed on the display unit 28, the four-way key 74, and the SET button 75.

A communication terminal 10 is a communication terminal for the digital camera 100 to communicate with a lens unit 150 (detachable; which will be described later). An eyepiece unit 16 is an eyepiece unit of an eyepiece finder (a look-in type finder), and a user can visually recognize an image displayed on an internal EVF 29 (which will be described later) via the eyepiece unit 16. An eyepiece detection unit 57 is an eyepiece detection sensor that detects whether or not a user (a photographer) is looking in the eyepiece unit 16. A lid 202 is a lid of a slot for storing the recording medium 200 (which will be described later). A grip part 90 is a holding part that is shaped such that the user can easily hold it with a right hand when holding the digital camera 100. The shutter button 61 and the main electronic dial 71 are disposed at positions at which they can be operated with an index finger of the right hand while the digital camera 100 is held with the grip part 90 gripped by a little finger, a ring finger and a middle finger of the right hand. Further, in the same state, the sub electronic dial 73 is disposed at a position at which the sub electronic dial 73 can be operated with a thumb of the right hand. A thumb rest part 91 (a thumb standby position) is a grip member provided on the back surface side of the digital camera 100 at a location at which the thumb of the right hand holding the grip part 90 can be easily placed without operating any operation members. The thumb rest part 91 is formed of a rubber member or the like for increasing a holding force (a grip feeling).

<Configuration Block Diagram of Digital Camera 100>

Figure 2:
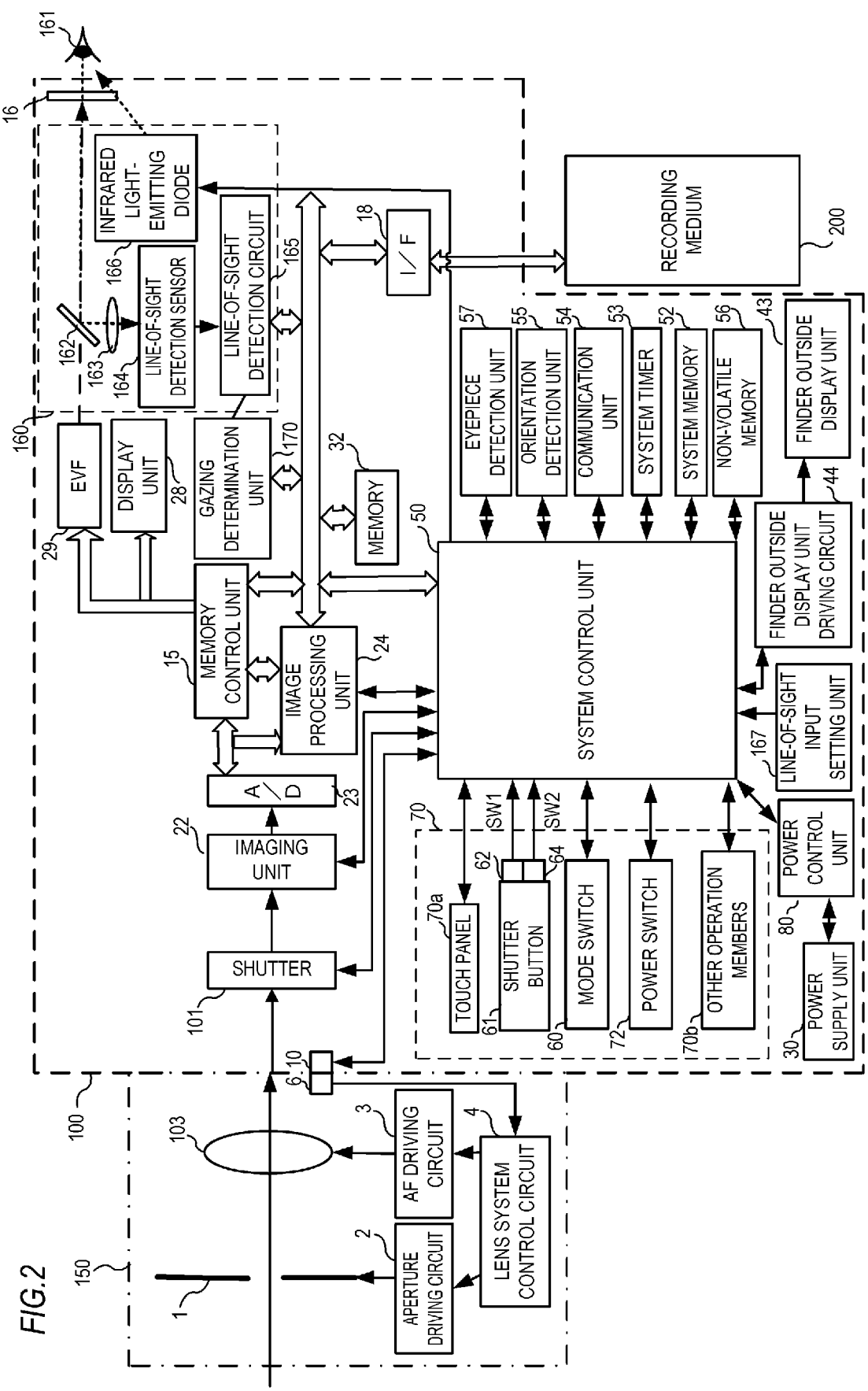
FIG. 2 is a block diagram of the digital camera according to the first embodiment.

FIG. 2 is a block diagram showing a configuration example of the digital camera 100. The lens unit 150 is a lens unit on which an interchangeable photographing lens is mounted. A lens 103 is normally configured of a plurality of lenses, but FIG. 2 simply shows only one lens. A communication terminal 6 is a communication terminal for the lens unit 150 to communicate with the digital camera 100 side, and the communication terminal 10 is a communication terminal for the digital camera 100 to communicate with the lens unit 150 side. The lens unit 150 communicates with a system control unit 50 via these communication terminals 6 and 10. In addition, the lens unit 150 performs control of an aperture 1 via an aperture driving circuit 2 using an internal lens system control circuit 4. Further, the lens unit 150 focuses by displacing the lens 103 via an AF driving circuit 3 using the lens system control circuit 4.

A shutter 101 is a focal plane shutter that can freely control an exposure time of an imaging unit 22 under control of the system control unit 50.

The imaging unit 22 is an imaging element configured of a CCD or a CMOS element that converts an optical image into an electrical signal. The imaging unit 22 may have an imaging plane phase difference sensor that outputs defocus amount information to the system control unit 50.

An image processing unit 24 performs predetermined processing (pixel interpolation, resize processing such as reduction, color conversion processing, and the like) on data from an A/D converter 23 or data from a memory control unit 15. Also, the image processing unit 24 performs a predetermined calculation process using captured image data, and the system control unit 50 performs exposure control and distance measurement control on the basis of the calculation results obtained by the image processing unit 24. Thus, through the lens (TTL) type autofocus (AF) processing, automatic exposure (AE) processing, flash pre-emission (EF) processing, and the like are performed. The image processing unit 24 further performs predetermined calculation processing using the captured image data and performs TTL type auto white balance (AWB) processing on the basis of obtained calculation results.

The memory control unit 15 controls data transmission and reception among the A/D converter 23, the image processing unit 24, and a memory 32. Output data from the A/D converter 23 is written to the memory 32 via the image processing unit 24 and the memory control unit 15. Alternatively, output data from the A/D converter 23 is written to the memory 32 via the memory control unit 15 without passing through the image processing unit 24. The memory 32 stores image data that is obtained by the imaging unit 22 and converted into digital data by the A/D converter 23 and image data to be displayed on the display unit 28 and the EVF 29. The memory 32 has a sufficient storage capacity for storing a predetermined number of still images and a predetermined amount of time of videos and audios.

Further, the memory 32 also serves as an image display memory (a video memory). The display image data written in the memory 32 is displayed on the display unit 28 or the EVF 29 via the memory control unit 15. Each of the display unit 28 and the EVF 29 performs display in accordance with a signal from the memory control unit 15 on a display such as an LCD or an organic EL. The live view display (LV) can be performed by sequentially transferring the data that is A/D-converted by the A/D converter 23 and stored in the memory 32 to the display unit 28 or the EVF 29 and displaying it. Hereinafter, an image displayed in the live view display is referred to as a live view image (LV image).

A line-of-sight detection unit 160 (eye tracker, eye tracking unit) detects a line of sight of the user in the eyepiece unit 16. The line-of-sight detection unit 160 includes a dichroic mirror 162, an imaging lens 163, a line-of-sight detection sensor 164, a line-of-sight detection circuit 165, and an infrared light-emitting diode 166. Also, since the system control unit 50 can execute a predetermined process in accordance with detection of the line of sight, the line-of-sight detection unit 160 can be said to be referred to as a part of an operation unit 70.

The infrared light-emitting diode 166 is a light emitting element for detecting a viewed position (position of the line of sight) of the user in a finder screen and irradiates an eyeball (eye) 161 of the user with infrared light. The infrared light emitted from the infrared light-emitting diode 166 is reflected by the eyeball (eye) 161, and the reflected infrared light reaches the dichroic mirror 162. The dichroic mirror 162 reflects only infrared light and transmits visible light. The reflected infrared light of which an optical path has been changed forms an image on an imaging plane of the line-of-sight detection sensor 164 via the imaging lens 163. The imaging lens 163 is an optical member that constitutes a line of sight detection optical system. The line-of-sight detection sensor 164 includes an imaging device such as a CCD image sensor.

The line-of-sight detection sensor 164 photoelectrically converts the reflected infrared light that is incident thereon into an electrical signal and outputs the electrical signal to the line-of-sight detection circuit 165. The line-of-sight detection circuit 165 detects a viewed position of the user from movement of the eyeball (eye) 161 of the user on the basis of the output signal of the line-of-sight detection sensor 164 and outputs detection information to the system control unit 50 and a gazing determination unit 170.

A line-of-sight input setting unit 167 sets whether the detection of the line of sight performed by the line-of-sight detection circuit 165 (line-of-sight detection unit 160) is valid or invalid. Alternatively, the line-of-sight input setting unit 167 sets whether processing of the system control unit 50 in accordance with an input of the line of sight is valid or invalid. For example, the user can arbitrarily set such a valid/invalid setting by operating the operation unit 70 in a menu setting.

The gazing determination unit 170 determines on the basis of the detection information received from the line-of-sight detection circuit 165 that, when a period in which the line of sight of the user is fixed to a certain area exceeds a predetermined threshold, the user is gazing at the area. Therefore, it can be said that the area is a gazing position (gazing area) at which the gazing is performed. In addition, "the line of sight is fixed to a certain area" indicates that, for example, an average position of movement of the line of sight is within the area until a predetermined period elapses, and that a variation (a dispersion) thereof is smaller than a predetermined value. Further, the predetermined threshold can be arbitrarily changed by the system control unit 50. Also, the gazing determination unit 170 may not be provided as an independent block, and the system control unit 50 may execute the same function as the gazing determination unit 170 on the basis of the detection information received from the line-of-sight detection circuit 165.

Various setting values of the camera such as the shutter speed and the aperture are displayed on the finder outside display unit 43 via a finder outside display unit driving circuit 44.

A non-volatile memory 56 is a memory that can be electrically erased and recorded on, and is, for example, a flash-ROM or the like. The non-volatile memory 56 stores constants, programs, and the like for an operation of the system control unit 50. The programs referred to here are programs for executing various flowcharts, which will be described later in the present embodiment.

The system control unit 50 is a control unit including at least one processor or circuit and controls the entire digital camera 100. The system control unit 50 realizes each process of the present embodiment, which will be described later, by executing programs recorded in the non-volatile memory 56 described above. A system memory 52 is, for example, a RAM, and the system control unit 50 develops, in the system memory 52, constants and variables for the operation of the system control unit 50, programs read from the non-volatile memory 56, and the like. Also, the system control unit 50 performs display control by controlling the memory 32, the display unit 28, and the like.

A system timer 53 is a time measuring unit that measures a time used for various controls and a time of an embedded clock.

A power control unit 80 is configured of a battery detection circuit, a DC-DC converter, a switch circuit for switching a block to be energized, and the like, and detects whether or not a battery is mounted, a type of the battery, detection of a remaining battery level, and the like. Further, the power control unit 80 controls the DC-DC converter on the basis of the detection results and an instruction of the system control unit 50 and supplies a necessary voltage to each unit including the recording medium 200 for a necessary period. A power supply unit 30 is configured of a primary battery such as an alkaline battery and a lithium battery, a secondary battery such as a NiCd battery, a NiMH battery, and a Li battery, an AC adapter, and the like.

A recording medium I/F 18 is an interface with the recording medium 200 such as a memory card or a hard disk. The recording medium 200 is a recording medium such as a memory card for recording captured images and includes a semiconductor memory, a magnetic disk, and the like.

A communication unit 54 transmits and receives a video signal and an audio signal to and from an external device connected in a wireless manner or by a wired cable. The communication unit 54 can also be connected to a wireless local area network (LAN) or the Internet. Further, the communication unit 54 can also communicate with the external device using Bluetooth (registered trademark) or Bluetooth (registered trademark) Low Energy. The communication unit 54 can transmit an image (including an LV image) captured by the imaging unit 22 and an image recorded in the recording medium 200 and can receive image data and other various information from the external device.

An orientation detection unit 55 detects an orientation of the digital camera 100 with respect to a direction of gravity. On the basis of the orientation detected by the orientation detection unit 55, whether an image captured by the imaging unit 22 is an image captured by holding the digital camera 100 horizontally or an image captured by holding the digital camera 100 vertically can be determined. The system control unit 50 can add orientation information corresponding to the orientation detected by the orientation detection unit 55 to an image file of the image captured by the imaging unit 22, or records the image by rotating it. For the orientation detection unit 55, an acceleration sensor, a gyro sensor, or the like can be used. It is also possible to detect movement (a pan, a tilt, a lift, whether stationary or not, etc.) of the digital camera 100 using the acceleration sensor or the gyro sensor serving as the orientation detection unit 55.

The eyepiece detection unit 57 is an eyepiece detection sensor that detects approach (eye proximity) of an eye (object) 161 to the eyepiece unit 16 of the eyepiece finder 17 (hereinafter, simply referred to as a "finder") and removal (eye separation) of the eye (object). The system control unit 50 switches between display (a display state) and non-display (a non-display state) of the display unit 28 and the EVF 29 in accordance with a state detected by the eyepiece detection unit 57. More specifically, at least in a photographing standby state and in a case in which switching of a display destination is automatic switching, during non-eye proximity, the display destination is set to the display unit 28 and its display is turned on and the EVF 29 is set to non-display. In addition, during the eye proximity, the display destination is set to the EVF 29 and its display is turned on, and the display unit 28 is set to non-display. For the eyepiece detection unit 57, for example, an infrared proximity sensor can be used, and it is possible to detect approach of any object to the eyepiece unit 16 of the finder 17 incorporating the EVF 29. When an object approaches, infrared light emitted from a light emitting unit (not shown) of the eyepiece detection unit 57 is reflected by the object and received by a light receiving unit (not shown) of the infrared proximity sensor. On the basis of an amount of the received infrared light, it is also possible to determine how far the object is from the eyepiece unit 16 (an eye proximity distance). As described above, the eyepiece detection unit 57 performs eye proximity detection that detects an approaching distance of the object to the eyepiece unit 16. It is assumed that when the object having approached the eyepiece unit 16 to within a predetermined distance after a non-eye proximity state (a non-proximity state) is detected, it is detected that the eye has approached thereto. It is assumed that when the object whose approach has been detected becomes separated therefrom after the eye proximity state (proximity state) by at least a predetermined distance, it is detected that the eye has been separated therefrom. A threshold for detecting the eye proximity and a threshold for detecting the eye separation may be different from each other, for example, by providing hysteresis. Further, after detection of the eye proximity, an eye proximity state is assumed until the eye separation is detected. After detection of the eye separation, a non-eye proximity state is assumed until the eye proximity is detected. Also, the infrared proximity sensor is an example, and the eyepiece detection unit 57 may use another sensor as long as it can detect approaching of an eye or an object regarded as the eye proximity.

The system control unit 50 can detect the following operations or states of the eyepiece unit 16 by controlling the gazing determination unit 170 or the eyepiece detection unit 57.

A line of sight that has not been directed to the eyepiece unit 16 is newly directed to the eyepiece unit 16. That is, this is the start of inputting the line of sight.
A state in which the line of sight is being input to the eyepiece unit 16.
A state in which the user is gazing at the eyepiece unit 16.
The line of sight directed to the eyepiece unit 16 has been removed. That is, this is the end of inputting the line of sight.
A state in which no line of sight is input to the eyepiece unit 16.

These operations and states and the position (direction) from which the line of sight is directed to the eyepiece unit 16 are notified to the system control unit 50 via an internal bus, and the system control unit 50 determines what operation (operation of the line of sight) has been performed on the eyepiece unit 16 on the basis of the notified information.

The operation unit 70 is an input unit that receives an operation (user operation) from a user, and is used to input various operation instructions to the system control unit 50. As shown in FIG. 2, the operation unit 70 includes the mode switch 60, the shutter button 61, the power switch 72, the touch panel 70a, and the like. The operation unit 70 includes, as other operation members 70b, the main electronic dial 71, the sub electronic dial 73, the four-way key 74, the SET button 75, the video button 76, the AE lock button 77, the enlargement button 78, the reproduction button 79, the menu button 81, and the like.

The mode switch 60 switches an operation mode of the system control unit 50 to one of a still image shooting mode, a video shooting mode, a reproduction mode, and the like. Modes included in the still image shooting mode include an auto shooting mode, an auto scene determination mode, a manual mode, an aperture priority mode (Av mode), a shutter speed priority mode (Tv mode), and a program AE mode (P mode). In addition, there are various scene modes, custom modes, and the like, which are imaging settings for each imaging scene. The mode switch 60 allows the user to directly switch to any of these modes. Alternatively, after temporarily switching to a list screen of the imaging modes with the mode switch 60, the mode may be selectively switched to any of displayed modes by using another operation member. Similarly, the video shooting mode may include a plurality of modes.

The shutter button 61 includes a first shutter switch 62 and a second shutter switch 64. The first shutter switch 62 is turned on by so-called half-pressing (an imaging preparation instruction) during operation of the shutter button 61 and generates a first shutter switch signal SW1. The system control unit 50 starts an imaging preparation operation such as an autofocus (AF) process, an auto exposure (AE) process, an auto white balance (AWB) process, and a flash pre-emission (EF) process in response to the first shutter switch signal SW1. The second shutter switch 64 is turned on when the operation of the shutter button 61 is completed, that is, when the shutter button 61 is fully pressed (an imaging instruction) and generates a second shutter switch signal SW2. In response to the second shutter switch signal SW2, the system control unit 50 starts a series of imaging processing operations from reading out the signal from the imaging unit 22 to writing the captured image as an image file on the recording medium 200.

The touch panel 70a and the display unit 28 can be integrally formed. For example, the touch panel 70a is configured such that light transmittance does not hinder display on the display unit 28 and is attached to an upper layer of a display surface of the display unit 28. In addition, input coordinates on the touch panel 70a are associated with display coordinates on the display surface of the display unit 28. Thus, it is possible to provide a graphical user interface (GUI) as if the user could directly operate a screen displayed on the display unit 28. The system control unit 50 can detect the following operations or states on the touch panel 70a.

A finger or pen that has not touched the touch panel 70a newly touches the touch panel 70a. That is, this is the start of a touch (hereinafter, referred to as a touch-down).
A state in which the touch panel 70a is being touched with a finger or a pen (hereinafter, referred to as a touch-on).
A finger or a pen is moving while touching the touch panel 70a (hereinafter, referred to as a touch-move).
A finger or pen touching the touch panel 70a has separated (been released) from the touch panel 70a. That is, the end of the touch (hereinafter, referred to as a touch-up).
A state in which nothing is touching on the touch panel 70a (hereinafter, referred to as a touch-off).

When the touch-down is detected, the touch-on is also detected at the same time. After the touch-down, the touch-on is normally continuously detected unless the touch-up is detected. When the touch move is detected, the touch-on is detected at the same time. Even when the touch-on is detected, the touch move is not detected unless a touch position is moved. After all the touched fingers or pens are detected to have been touched up, it becomes the touch-off.

These operations and states and the position coordinates in which the finger or the pen is touching the touch panel 70a are notified to the system control unit 50 via the internal bus.

Then, the system control unit 50 determines what operation (touch operation) has been performed on the touch panel 70a on the basis of the notified information. As for the touch-move, a moving direction of the finger or the pen moving on the touch panel 70a can also be determined for each of a vertical component and a horizontal component on the touch panel 70a on the basis of changes in the position coordinates. When it is detected that the touch-move has been performed for at least a predetermined distance, it is determined that a sliding operation has been performed. An operation of quickly moving a finger on the touch panel 70a by a certain distance while touching the finger and releasing the finger is referred to as a flick. In other words, the flick is an operation of quickly tracing the touch panel 70a as if to flick it with a finger. When it is detected that a touch-move has been performed for at least a predetermined distance at at least a predetermined speed, and in this state, the touch-up is detected, it can be determined that the flick has been performed (it can be determined that there has been the flick following the sliding operation). Further, a touch operation of touching (multi-touching) a plurality of positions (for example, two points) together to bring the touch positions closer to each other is referred to as a pinch-in, and a touch operation for moving the touch positions away from each other is referred to as a pinch-out. The pinch-out and pinch-in are collectively referred to as a pinch operation (or simply a pinch). The touch panel 70a may be any of various types of touch panels such as a resistive film type, a capacitive type, a surface acoustic wave type, an infrared type, an electromagnetic induction type, an image recognition type, and an optical sensor type. There are a method of detecting that a touch has been made when there is a touch on the touch panel, and a method of detecting that a touch has been made when there is a finger or a pen approaching the touch panel, and any method may be used.

<Function Execution Process in Accordance with Line of Sight>

The digital camera 100 according to the present embodiment can execute various functions in accordance with gazing of a user (a line of sight of a user) on the EVF 29. Further, the digital camera 100 changes a period of the gazing for executing a function in accordance with a display mode of the EVF 29, thereby realizing a start of the function in accordance with the line of sight at a timing suitable for the user. Hereinafter, processing up to execution of a function in accordance with the line of sight of the digital camera 100 will be described with reference to a flowchart shown in FIG. 3.

Each process in the flowchart of FIG. 3 is realized by the system control unit 50 developing a program stored in the non-volatile memory 56 in the system memory 52, and executing it to control each functional block. The flowchart in FIG. 3 is started when the digital camera 100 is activated and the line-of-sight detection circuit 165 controlled by the system control unit 50 determines that there is an input of the line of sight. Also, at a starting point of the flowchart, a gazing period T indicating a period in which a viewed position of the user is continuously fixed in a part of an area displayed on the EVF 29 is 0. The system control unit 50 continuously measures (incrementally) the gazing period T while processing of the flowchart is being performed.

Also, in the present embodiment, the display unit 28 and the EVF 29 have a plurality of display modes (operation modes). For example, the display modes include an imaging mode for performing imaging using the imaging unit 22 while performing LV display, a reproduction mode for playing back a recorded image, and a MENU mode (a setting mode) for performing various settings of the digital camera 100. Further, by operating the operation unit 70, the user can arbitrarily issue an instruction (a switching instruction) to switch to any of the display modes. In addition, the switching instruction of the display mode has a higher priority, and when the switching instruction of the display mode is detected even when any processing in the flowchart is being performed, the system control unit 50 temporarily suspends the processing and changes the display mode.

In S301, the system control unit 50 determines whether or not the display mode of the EVF 29 is the imaging mode. When the display mode is the imaging mode, the process proceeds to S302, and otherwise, the process proceeds to S303.

In S302, the system control unit 50 sets the gazing determination period TH to a period THa. Here, the gazing determination period TH is a threshold for determining whether or not to execute a function in accordance with the line of sight of the user.

In S303, the system control unit 50 sets the gazing determination period TH in a period THb that is longer than the period THa.

In S304, the system control unit 50 controls the gazing determination unit 170 to determine whether or not the viewed position of the user has changed on the basis of the detection information received from the line-of-sight detection circuit 165. Also, the determination of the change in the viewed position need not be strict, and for example, when an option (content) present at the viewed position of the user does not change between the previous time and this time, the system control unit 50 may determine that the viewed position has not changed. For example, in a screen shown in FIG. 4A, even when the viewed position of the user has changed from an area 410 inside an option 401 to an area 411 inside the option 401, it can be determined that the viewed position has not changed. Also, this determination may be made in accordance with a dispersion (variation) in movement of the viewed position in a short period. That is, when an average position of the viewed position in a short period is within a predetermined range and the dispersion is within a threshold, it may be determined that the viewed position has not changed. In a case in which it is determined that the viewed position has not changed, the process proceeds to S306, and otherwise, the process proceeds to S305.

In S305, the system control unit 50 resets (at 0) the gazing period T.

In S306, the system control unit 50 controls the gazing determination unit 170 to determine whether or not the user has been gazing for a period longer than the gazing determination period TH, that is, whether or not a state in which a condition regarding the viewed position corresponding to the fact that there is gazing is satisfied has continued. More specifically, when the condition that the gazing period T is longer than the gazing determination period TH is satisfied, the system control unit 50 determines that the user has been gazing for the period longer than the gazing determination period TH. In the case in which the user has been gazing for the period longer than the gazing determination period TH, the process proceeds to S307, and otherwise, the process proceeds to S304.

Therefore, in the present embodiment, when the display mode is the imaging mode in S306, it is determined whether or not the user has been gazing for a period longer than the period THa. On the other hand, when the display mode is not the imaging mode, it is determined whether or not the user has been gazing for a period longer than the period THb.

In S307, the system control unit 50 executes a function of the digital camera 100 in accordance with information displayed at a gazing position at which the gazing is performed. For example, when the display mode is the imaging mode, the system control unit 50 performs an AF operation function for the gazing position when the gazing is performed for a period longer than the period THa. That is, the system control unit 50 performs the autofocus at the gazing position (a focus detection position corresponding to the gazing position). Also, the system control unit 50 is not limited to executing autofocus, and may perform, for example, determination of an aperture value or a shutter speed (execution of automatic exposure) in accordance with brightness of a viewpoint position or execution of enlargement and reduction. In addition, the system control unit 50 does not necessarily need to execute the function for the viewed position, and for example, may determine whether autofocus or automatic exposure is valid or invalid.

On the other hand, in the case in which the display mode is the MENU mode, when the gazing is performed for a period longer than the period THb, the system control unit 50 performs a function corresponding to a display item displayed at a gazing position (a position corresponding to the gazing position) among a plurality of displayed display items (options). More specifically, the system control unit 50 executes, for example, a function of displaying a hierarchy which is lower than a display item displayed at the gazing position among the plurality of displayed display items. When the plurality of displayed display items are display items of the lowest hierarchy, a function indicated by the display item of the lowest hierarchy displayed at the gazing position is executed. For example, when the display item of the lowest hierarchy displayed at the gazing position is an option 407 in FIG. 4B, a no-card release is set to "perform (YES)," which is recorded in the non-volatile memory 56. Also, the no-card release is a process from reading out a signal from the imaging unit 22 to displaying a captured image as a review image on the display unit 28 or the EVF 29 in accordance with the second shutter switch signal SW2 even when the recording medium 200 is not mounted thereon. When the display item of the lowest hierarchy displayed at the gazing position is an option 408 in FIG. 4B, the no-card release is set to "not perform (NO)," which is recorded in the non-volatile memory 56. Also, the system control unit 50 is not limited to such a function and may perform another arbitrary function. Further, the display item displayed at the gazing position is a display item that includes at least a part of the gazing position in a displayed range.

Therefore, when the gazing is not performed for a period longer than the gazing determination period TH, the system control unit 50 does not execute a function in accordance with the detection result (line-of-sight detection result) of the line of sight (gazing). In addition, even when the gazing is not performed for a period longer than the gazing determination period TH, the system control unit 50 may execute a similar function (a function corresponding to the display item at a current viewed position) in response to an operation other than the line of sight, for example, pressing of a push button (for example, the SET button 75) by the user.

Also, in the present embodiment, in the case of the imaging mode, the reason why the gazing determination period TH is shorter than that in the other display modes is that since the imaging mode is mainly used for selecting a ranging point or the like, the user may select it again even when an undesired position is selected. For this reason, priority is given to real-time execution of the function rather than to the fact that the function desired by the user is executed. In the imaging mode, a situation of an object changes in real time, and thus, when a timing of executing the function is later than the user's intention, there is a possibility of resulting in a loss of an imaging opportunity (a shutter chance). In order to prevent this, priority is given to high immediacy.

On the other hand, in the MENU mode or the like, when an incorrect option is selected, the display moves to a lower hierarchy and a cancel operation is required for an operation not intended by the user, and thus, the gazing determination period TH is set to be longer for a secure input. Also, since it is a scene not displaying the LV image, it is not a state in which the user is ready to take a picture immediately, and thus does not require immediacy as in the imaging mode. That is, in the MENU mode or the like, priority is given to reducing a risk of the digital camera 100 performing an operation not intended by the user.

The display mode may have a mode other than the imaging mode, the MENU mode, and the reproduction mode, and may have, for example, an editing mode. In this editing mode, a captured image (an image recorded on the recording medium 200) is reproduced and displayed on the EVF 29, the system control unit 50 changes a position of the image such that, for example, when the user gazes, the viewed position of the user is located at a center thereof. Therefore, even in the case of the editing mode, when the center is changed to an undesired position, the user may gaze it again. For this reason, when the display mode is the editing mode, as in the imaging mode, the system control unit 50 may set the gazing determination period TH shorter than that in the case of the MENU mode or the reproduction mode.

As described above, according to the first embodiment, the digital camera 100 controls the gazing period until a function is executed in accordance with the display mode. This enables the function to be executed by the line of sight at the timing intended by the user.

Second Embodiment

Hereinafter, in a second embodiment, the digital camera 100 that controls the gazing determination period according to the number of selectable options displayed on the EVF 29 in addition to the processing described in the first embodiment will be described. Also, the digital camera 100 according to the present embodiment has the configuration shown in FIGS. 1A, 1B and 2 as in the first embodiment.

Figure 4B:
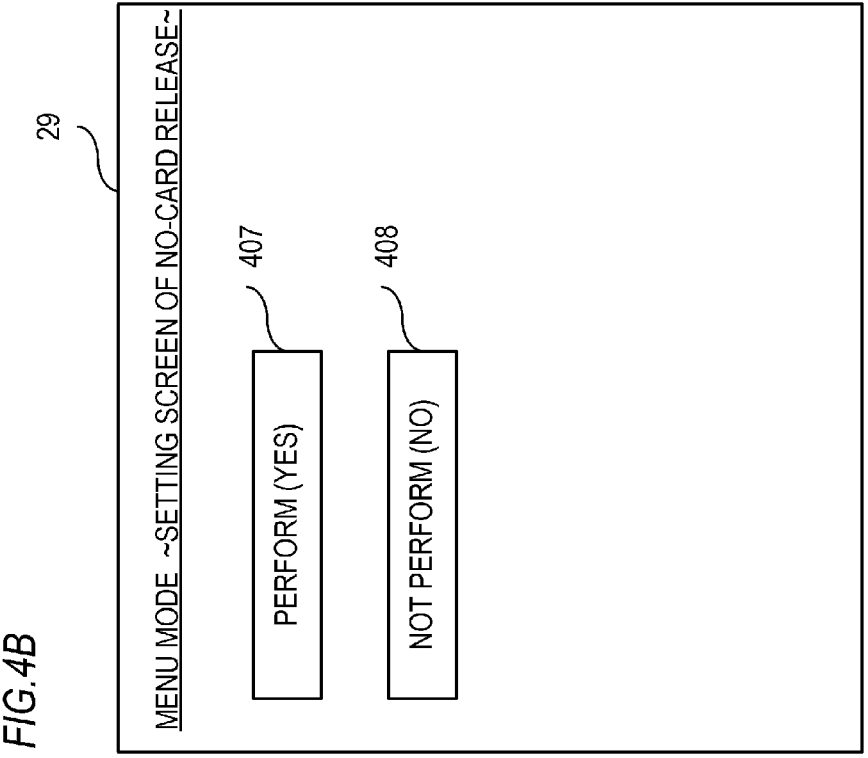
FIGS. 4A and 4B are diagrams illustrating a display in a MENU mode according to an embodiment.
Figure 4A:
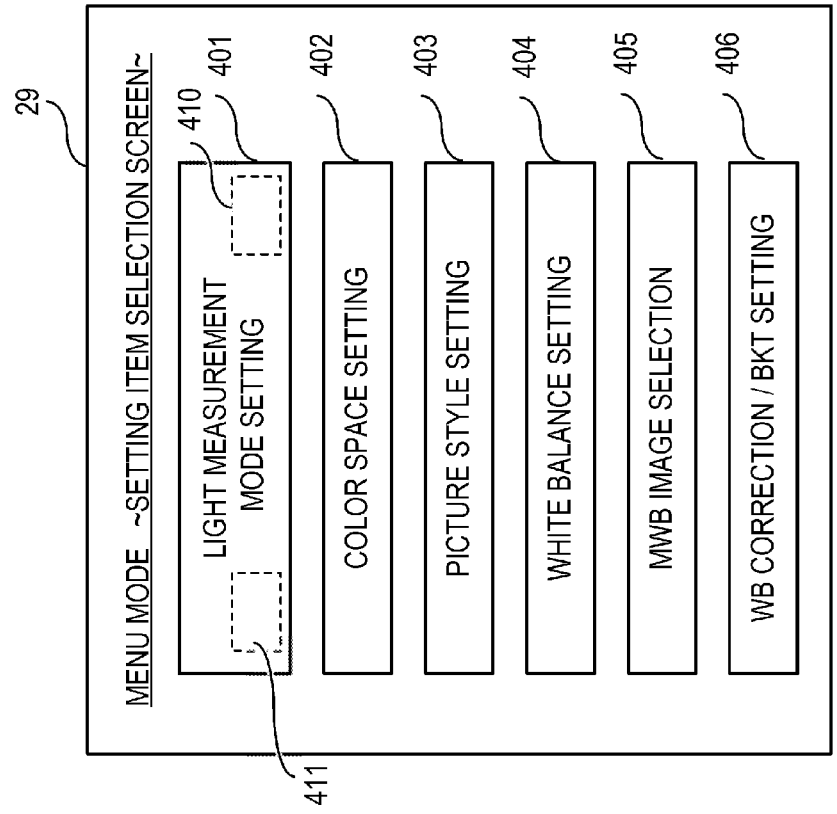

Here, options that can be selected by the user will be described with reference to FIGS. 4A and 4B. FIGS. 4A and 4B show a screen of the EVF 29 in the MENU mode.

FIG. 4A shows a case in which the number of selectable options is six, and the user can cause the digital camera 100 to execute a function corresponding to a gazed option by gazing at any of options 401 to 406.

FIG. 4B shows a case in which the number of selectable options is two, and the user can cause the digital camera 100 to execute a function corresponding to a gazed option by gazing at either of options 407 and 408.

<Function Execution Process in Accordance with Line of Sight>

FIG. 5 is a flowchart showing a function execution process in accordance with the line of sight performed by the digital camera 100 according to the present embodiment. Each process in the flowchart of FIG. 5 is realized by the system control unit 50 that develops a program stored in the non-volatile memory 56 in the system memory 52, and executing it to control each functional block. Also, steps S301 to S307 are the same steps as those in the flowchart of FIG. 3, and therefore are denoted by the same signs, and detailed descriptions thereof will be omitted. The flowchart in FIG. 5 is started when the digital camera 100 is activated and the line-of-sight detection circuit 165 controlled by the system control unit 50 determines that there is an input of the gazing.

In the present embodiment, when the process of S303 is performed, the process proceeds to S501.

In S501, the system control unit 50 determines whether or not the number of options displayed on the EVF 29 is larger than a predetermined value. When the number of options is larger than the predetermined value, the process proceeds to S304, and otherwise, the process proceeds to S502.

For example, it is assumed that the predetermined value is four. Then, in the case shown in FIG. 4A, since the number of options is six, the system control unit 50 determines that the number is larger than the predetermined value. On the other hand, in the case of FIG. 4B, since the number of options is two, the system control unit 50 determines that the number is not more than the predetermined value.

In S502, the system control unit 50 sets the gazing determination period TH to a period THc shorter than the period THb. This is because when the number of options displayed on the screen is smaller, it is unlikely that an incorrect option is selected based on determination of the user's line of sight. Also, although there is no limitation on a magnitude relationship between the period THa and the period THc, for example, the system control unit 50 may set the period THa to 200 ms, the period THb to 1000 ms, and the period THc to 500 ms. That is, it is conceivable that the relationship of THa<THc<THb is satisfied. Also, values of the periods THa, THb, and THc are not limited thereto and may be other values.

The period THa is mainly a determination period until an AF control function is performed on an object to be imaged and is preferably set to a relatively shorter period for the reason described in the first embodiment.

The period THb and the period THc are periods until an icon selection function is performed in the MENU mode or the like. Here, when an unintended selection is made by the user in the selection, for example, it is conceivable that it is moved to a lower hierarchy, and accordingly, a cancel operation is required to execute the function again (return to a higher hierarchy). Also, since it is a scene not displaying the LV image, it is not a state in which the user is ready to take a picture immediately and does not require immediacy as in the imaging mode. For that reason, it is preferable that the gazing determination period is set in a period in which the user can reliably make the selection in order to minimize a risk of the unintended selection by the user. However, when the gazing determination period is too long, this makes the user feel that operation responsiveness is poor, which leads to a decrease in operability. Therefore, it is preferable that a gazing determination period that is not too long is set within a range that can be reliably selected by the user. Therefore, in the present embodiment, in view of a lower possibility of an incorrect option being selected due to a position input in accordance with the line of sight on a screen with fewer displayed options, the gazing determination period TH is set to the period THc shorter than the period THb.

Also, since a period until the system control unit 50 executes the function corresponding to the gazing is different between the case in which the gazing determination period TH is set to the period THb and the case in which the gazing determination period TH is set to the period THc, it can be said that they are different display modes (operation modes). That is, it can be said that, when the gazing determination period TH is set to the period THc, the display mode is a display mode in which the number of selectable options is displayed to be a certain number. It can be said that, when the gazing determination period TH is set to the period THb, the display mode is a display mode in which the number of selectable options is displayed to be a number larger than the certain number.

Also, although the system control unit 50 sets the gazing determination period TH into the two types of periods in accordance with the number of selectable options in the present embodiment, the period TH is not limited to the two types, and may be at least three types, and the gazing determination period TH may be longer as the number of selectable options is larger.

Also, although the system control unit 50 changes the gazing determination period TH in accordance with the number of selectable options in the present embodiment, for example, the gazing determination period TH may be changed in accordance with an interval between displayed options (a mutual distance among a plurality of options on the same screen). Specifically, when the interval between the options is smaller than a predetermined value, the system control unit 50 sets the gazing determination period TH to the period THb, and otherwise, sets the gazing determination period TH to the period THc. This is because when the interval between the options is smaller, there is a higher possibility of the system control unit 50 detecting an incorrect option as the option corresponding to the viewed position.

Further, the system control unit 50 may change the gazing determination period TH in accordance with the number of characters per one option. For example, when the number of characters per option is larger than a predetermined value, the system control unit 50 sets the gazing determination period TH to the period THb, and otherwise, sets the gazing determination period TH to the period THc. This is because when the number of characters per option is larger, it is expected to take time for the user to understand content of the option, and thus it takes time to see the option, not for selecting, but for understanding.

As described above, the digital camera 100 according to the second embodiment controls the gazing determination period in accordance with the number of options displayed on the EVF 29 which can be selected by the user. Thus, execution of the function in accordance with the line of sight is easily performed at the timing intended by the user, and it is possible to reduce a risk of performing an operation not intended by the user.

Third Embodiment

As a third embodiment, a digital camera 100 that performs a process of clearly indicating an area corresponding to a gazing position to the user before performing the process corresponding to the gazing according to the second embodiment will be described with reference to a flowchart shown in FIG. 6. Also, the digital camera 100 according to the present embodiment has the configuration shown in FIGS. 1A, 1B and 2 as in the first embodiment.

Each process in the flowchart of FIG. 6 is realized by the system control unit 50 developing a program stored in the non-volatile memory 56 in the system memory 52, and executing it to control each functional block. Also, the same steps as those in the flowchart shown in FIG. 5 are denoted by the same signs, and detailed descriptions thereof will be omitted. The flowchart in FIG. 6 is started when the digital camera 100 is activated and the line-of-sight detection circuit 165 controlled by the system control unit 50 determines that there is an input of the line of sight.

In S301, as in the first embodiment, the system control unit 50 determines whether or not the display mode of the EVF 29 is the imaging mode. When the display mode is the imaging mode, the process proceeds to S601, and otherwise, the process proceeds to S602.

In S601, the system control unit 50 sets the gazing determination period TH to the period THa. Further, the system control unit 50 sets a display determination period TH' to a period THa' shorter than the period THa. Here, the display determination period TH' is a threshold for determining whether or not to perform an identification display indicating a position (gazing position) to which the user's viewpoint position is fixed.

In S602, the system control unit 50 sets the gazing determination period TH to the period THb. Further, the system control unit 50 sets the display determination period TH' to a period THb' shorter than the period THb.

In S501, as in the second embodiment, the system control unit 50 determines whether or not the number of options displayed on the EVF 29 is larger than a predetermined value. When the number of options is larger than the predetermined value, the process proceeds to S304, and otherwise, the process proceeds to S603.

In S603, the system control unit 50 sets the gazing determination period TH to the period THc. Further, the system control unit 50 sets the display determination period TH' to a period THc' shorter than the period THc.

Also, for example, there is no particular limitation on a magnitude relationship between the periods THa, THb', and THc', a magnitude relationship between the periods THb, THa', and THc', and a magnitude relationship between the periods THa', THb', and THc'. For example, it is conceivable that all of the periods THa', THb', and THc' are set to 100 ms. Each of the periods THa', THb', and THc' is a period until the identification display indicating the gazing position of the user is displayed on the EVF 29 and does not determine execution of the function in accordance with the line of sight. For that reason, it is preferable that the period is relatively shorter so that the user can intuitively recognize movement of the line of sight, and that the period does not change in the imaging mode and the other modes. However, the values of the periods THa', THb', and THc' are not limited to these and may be other values.

In S304, the system control unit 50 determines whether or not the viewed position has changed as in the first embodiment. When there is a change in the viewed position, the process proceeds to S604, and otherwise, the process proceeds to S605.

In S604, the system control unit 50 resets the gazing period T. At this time, when the identification display indicating the gazing position is displayed on the EVF 29, the system control unit 50 sets the identification display not to be displayed (ends the identification display).

In S605, the system control unit 50 determines whether or not the gazing period T is longer than the display determination period TH'. When the gazing period T is longer than the display determination period TH', the process proceeds to S606, and otherwise, the process proceeds to S304.

In S606, the system control unit 50 performs the identification display indicating the gazing position on the EVF 29. When the identification display indicating the gazing position is already displayed on the EVF 29, the system control unit 50 continues the display. Also, details of the identification display indicating the gazing position will be described later.

In S306, as in the first embodiment, the system control unit 50 determines whether or not the gazing period T is longer than the gazing determination period TH. When the gazing period T is longer than the gazing determination period TH, the process proceeds to S307, and otherwise, the process proceeds to S304.

In S307, as in the first embodiment, the system control unit 50 executes the function of the digital camera 100 in accordance with the gazing position.

(Identification Display Indicating Gazing Position)

Here, the identification display indicating the gazing position on the EVF 29 will be described in detail with reference to FIGS. 7A to 9B.

Figure 7A:
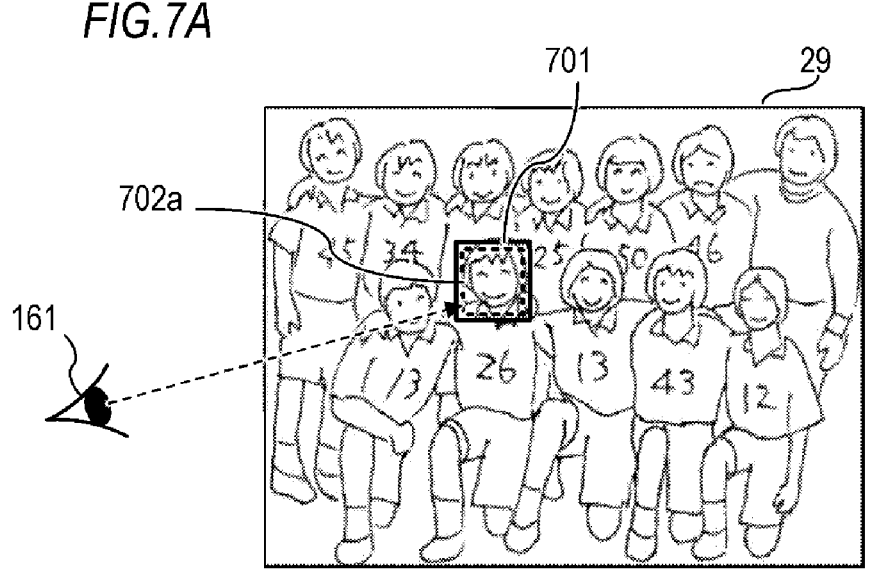
FIGS. 7A and 7B are diagrams showing an identification display according to the third embodiment.
Figure 7B:
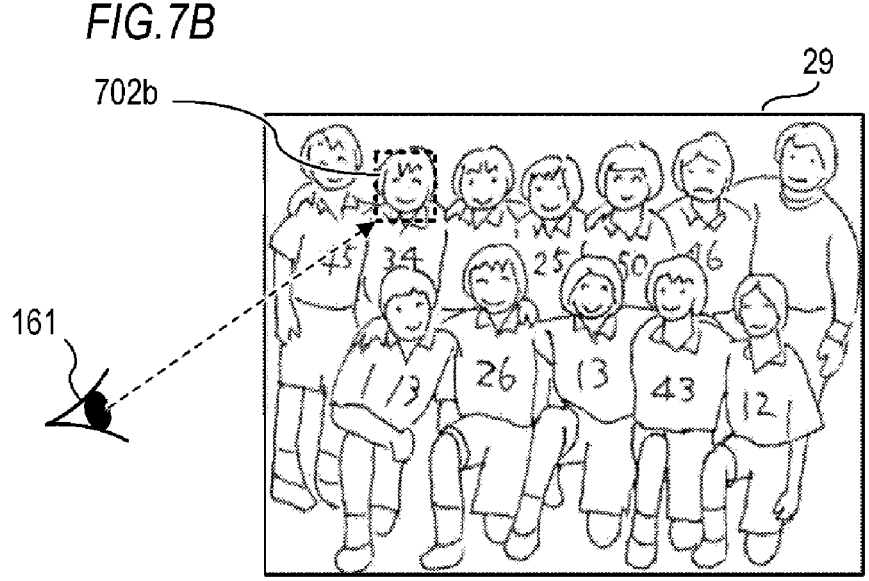

FIGS. 7A and 7B are display examples in a case in which the display mode of the EVF 29 is the imaging mode, the user is looking at a line of sight position 702a indicated by a dashed line in FIG. 7A, and the user is looking at a line of sight position 702b indicated by a dashed line in FIG. 7B.

FIG. 7A shows a case in which the gazing period T for a face of a person has passed the period THa' ("YES" in S301 and "YES" in S605). In this case, in S606, the system control unit 50 displays, on the EVF 29, a display icon 701 that is the identification display indicating the gazing position indicated by a thick frame.

On the other hand, FIG. 7B is diagram after the display shown in FIG. 7A, and FIG. 7B shows a case in which the line of sight is moved to another person before the gazing period T for the face of the person has passed the period THa ("YES" in S304). In this case, in S604, the system control unit 50 sets the display icon 701 in FIG. 7A not to be displayed. That is, even in a case in which the identification display is performed in accordance with the gazing period T being longer than the display determination period TH', when the viewed position changes before the gazing period T exceeds the gazing determination period TH, the system control unit 50 sets the identification display not to be displayed.

Figure 8A:
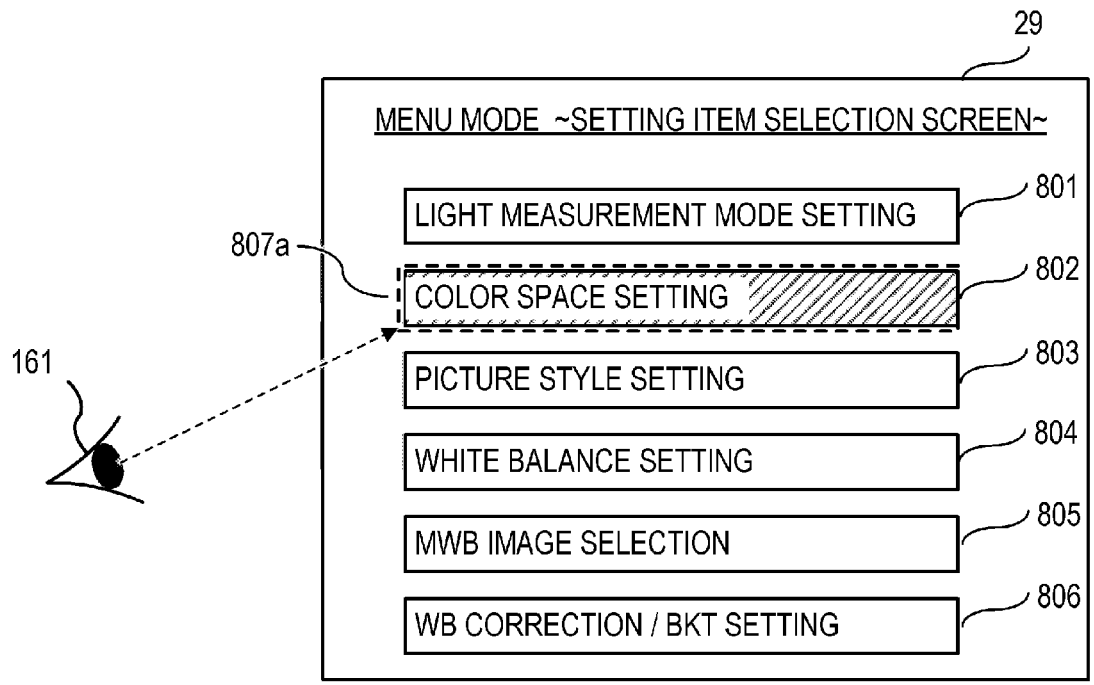
FIGS. 8A and 8B are diagrams showing an identification display according to the third embodiment.
Figure 8B:
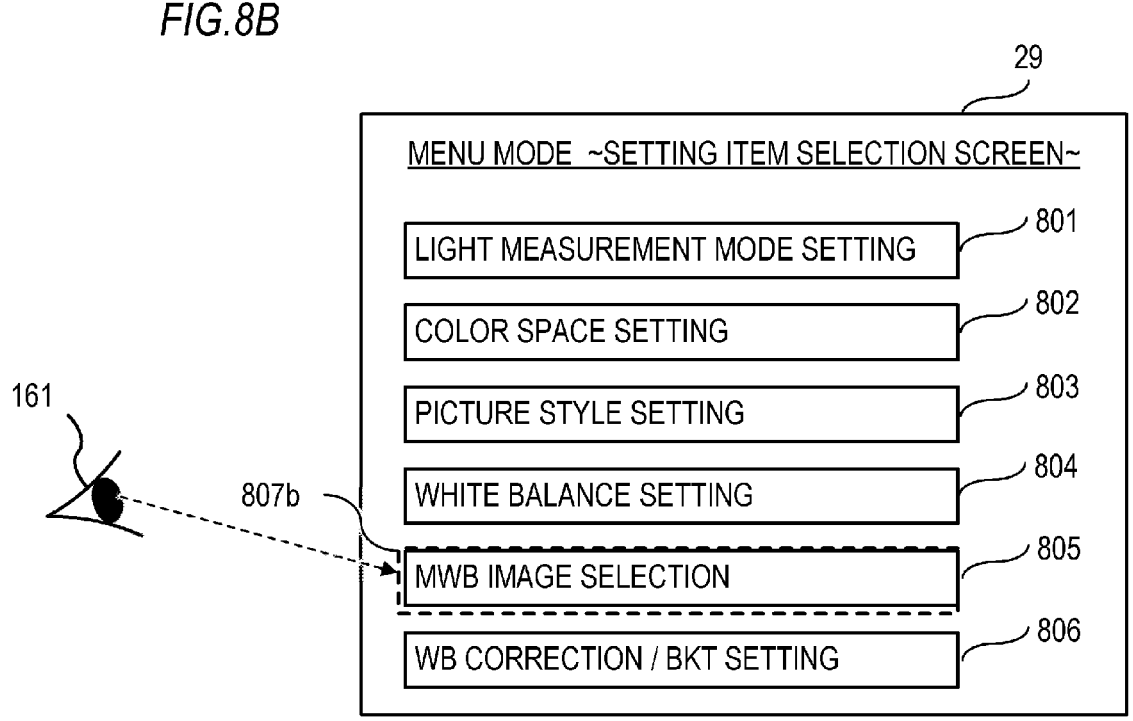

FIGS. 8A and 8B show that the display mode of the EVF 29 is the MENU mode, and show display examples when the number of selectable options 801 to 806 displayed on the EVF 29 is larger than a predetermined value ("NO" in S301 and "YES" in S501). The user is looking at a line of sight position 807a indicated by a dashed line in FIG. 8A, and the user is looking at a line of sight position 807b indicated by a dashed line in FIG. 8B.

FIG. 8A shows a case in which the gazing period T for an option 802 has passed the period THb' ("YES" in S605). In this case, in S606, the system control unit 50 performs the identification display indicating the gazing position by highlighting and displaying the option 802.

FIG. 8B is a diagram after the display shown in FIG. 8A, and shows a case in which the line of sight is moved to another option 805 before the gazing period T for the option 802 has passed the period THb ("YES" in S304). In this case, in S604, the system control unit 50 cancels the highlighting of the option 802, thereby setting the identification display indicating the gazing position not to be displayed.

Figure 9A:
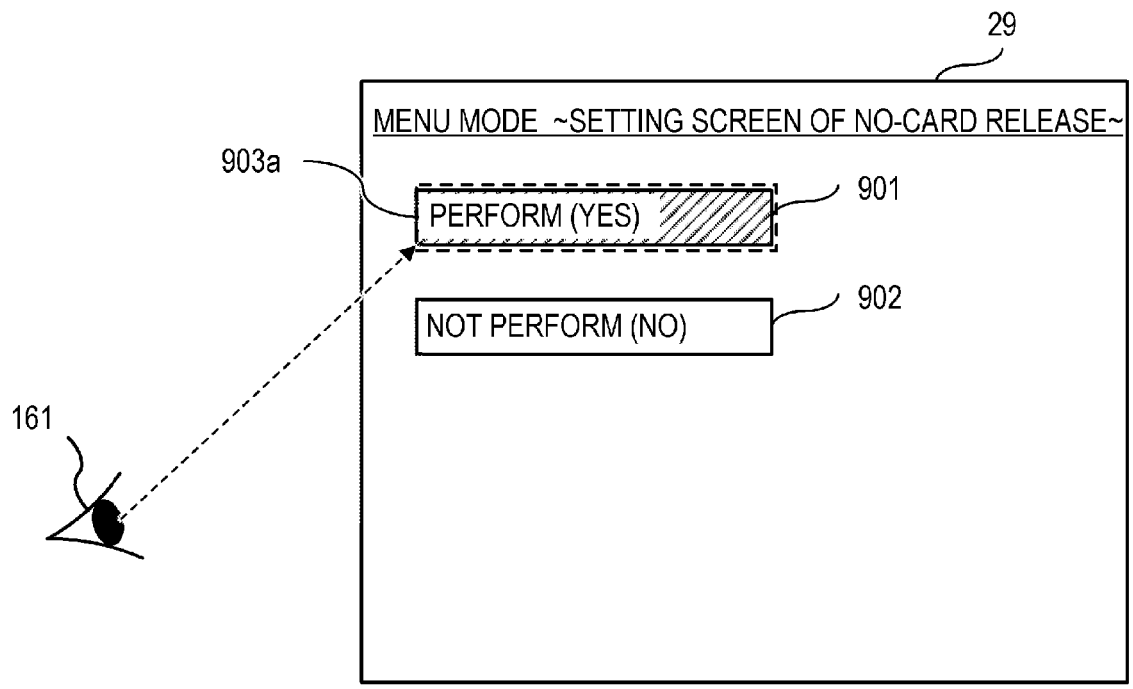
FIGS. 9A and 9B are diagrams showing an identification display according to the third embodiment.
Figure 9B:
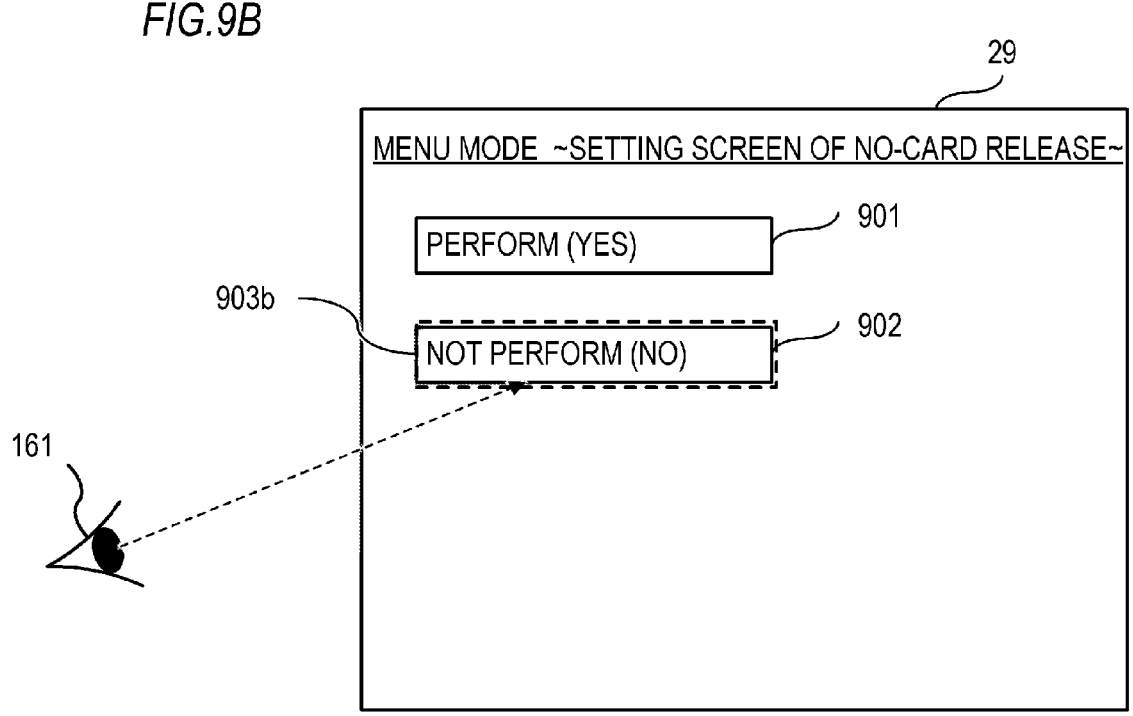

FIGS. 9A and 9B show that the display mode of the EVF 29 is the MENU mode, and show display examples when the number of selectable options 901 and 902 displayed on the EVF 29 is not more than a predetermined value ("NO" in S301 and "NO" in S501). The user is looking at a line of sight position 903a indicated by a dashed line in FIG. 9A, and the user is looking at a line of sight position 903b indicated by a dashed line in FIG. 9B.

FIG. 9A shows a case in which the gazing period T for the option 901 has passed the period THc' ("YES" in S605). In this case, in S606, the system control unit performs the identification display indicating the gazing position by highlighting and displaying the option 901.

FIG. 9B is diagram after the display shown in FIG. 9A, and shows a case in which the line of sight is moved to another option 902 before the gazing period T for the option 901 has passed the period THc ("YES" in S304). In this case, in S604, the system control unit 50 cancels the highlighting of the option 901, thereby setting the identification display indicating the gazing position not to be displayed.

As described above, according to the third embodiment, the control for performing the identification display indicating the gazing position is performed before determination of executing the function corresponding to the line of sight in accordance with the gazing determination. Since this allows the user to more intuitively recognize the viewed position, the function corresponding to the line of sight can be easily executed as intended by the user, and a risk of performing an operation unintended by the user can be further reduced.

According to the present invention, it is possible to provide an electronic device that can execute a function in accordance with a line of sight of a user at more appropriate timing.

The electronic device according to the present embodiment is not limited to the digital camera 100. For example, the electronic device may be a PC having a line-of-sight detection unit that detects a viewed position on a PC monitor. In the case of such a PC, for example, the PC may control a period until execution of a function in accordance with the line of sight in response to content (a display mode; an operation mode) displayed on the monitor. Also, a line-of-sight detection unit may be embedded in the PC or may be connected to the PC from outside. That is, a target of a position input in accordance with the user's line of sight is not limited to the display unit in the finder.

Also, the above-described various controls that have been described as being performed by the system control unit 50 may be performed by one piece of hardware, and a plurality of pieces of hardware (for example, a plurality of processors and circuits) may share the processing to control the entire device.

Also, although the present invention has been described in detail based on the preferred embodiments, the present invention is not limited to these specific embodiments, and various embodiments within a range not departing from the gist of the present invention are also included in the present invention. Further, each of the above-described embodiments is merely an embodiment of the present invention, and the embodiments can be appropriately combined with each other.

Also, although the case in which the present invention is applied to a digital camera has been described as an example in the above-described embodiments, the present invention is not limited to this example and is applicable to any electronic device that can execute a function in accordance with the gazing position. That is, the present invention is applicable to a personal computer, a PDA, a mobile phone terminal, a portable image viewer, a print device having a display, a digital photo frame, a music player, a game machine, an electronic book reader, and the like.

Also, the present invention is not limited to an imaging device main body, and may be also applicable to a control device that communicates with an imaging device (including a network camera) via a wired or wireless communication and remotely controls the imaging device. Examples of the device that remotely controls the imaging device include devices such as a smartphone, a tablet PC, and a desktop PC. The imaging device can be controlled remotely by notifying the imaging device of a command for performing various operations and settings from the control device side based on an operation performed on the control device side and processing performed on the control device side. In addition, a live view image captured by the imaging device may be received via a wired or wireless communication and displayed on the control device side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-100195, filed on May 29, 2019, which is hereby incorporated by reference herein in its entirety.

What is claimed is:

1. An electronic device comprising at least one memory and at least one processor which function as:
   a line-of-sight detection unit configured to detect a viewed position of a user; and
   a control unit configured to perform control such that, 1) in a first operation mode, a first function corresponding to a fact that there is gazing is executed in accordance with a state in which a first condition is satisfied in the line-of-sight detection unit, and 2) in a second operation mode, a second function corresponding to a fact that there is gazing is executed in accordance with a state in which a second condition is satisfied in the line-of-sight detection unit, wherein the first condition is a condition regarding the viewed position representing a fact that the user has been gazing for a first period, the second condition is a condition regarding the viewed position representing a fact that the user has been gazing for a second period longer than the first period, and the first operation mode is an imaging mode for performing imaging by an imaging unit.

2. The electronic device according to claim 1, wherein the first function is to execute autofocus at a gazing position.

3. The electronic device according to claim 1, wherein the second operation mode is at least one of a reproduction mode for reproducing a recorded image and a setting mode for performing setting of the electronic device.

4. The electronic device according to claim 1, wherein the second function is a function corresponding to a display item displayed at a gazing position among a plurality of display items displayed on a display unit.

5. The electronic device according to claim 4, wherein the second function is a function of displaying a hierarchy which is lower than the display item displayed at the gazing position among the plurality of display items displayed on the display unit.

6. The electronic device according to claim 1, wherein the control unit is further configured to perform control such that, in a third operation mode, a third function corresponding to a fact that there is gazing is executed in accordance with a state in which a third condition is satisfied in the line-of-sight detection unit, the third condition is a condition regarding the viewed position representing a fact that the user has been gazing for a third period longer than the second period.

7. The electronic device according to claim 6, wherein the second operation mode is a display mode in which a first number of selectable options are displayed on a display unit, the third operation mode is a display mode in which a second number of selectable options are displayed on the display unit, and the second number larger than the first number.

8. The electronic device according to claim 7, wherein the second operation mode and the third operation mode are operation modes different from an imaging mode for performing imaging using an imaging unit, and are at least one of a reproduction mode for reproducing a recorded image and a setting mode for performing setting of the electronic device.

9. The electronic device according to claim 1, wherein the control unit is further configured to perform control such that, 1) in the first operation mode, the first function in accordance with a line-of-sight detection result is not executed until continuation of the state in which a condition regarding the viewed position corresponding to a fact that there is gazing is satisfied reaches the first period in the line-of-sight detection unit, and 2) in the second operation mode, the second function in accordance with a line-of-sight detection result is not executed until continuation of the state in which the condition regarding the viewed position corresponding to a fact that there is gazing is satisfied reaches the second period in the line-of-sight detection unit.

10. The electronic device according to claim 1, wherein the control unit is further configured to perform control such that, in the line-of-sight detection unit in the first operation mode, 1) a first identification display indicating an area corresponding to a gazing position on a display unit is performed in accordance with a state in which a condition regarding the viewed position representing a fact that gazing has been performed for a fourth period shorter than the first period is satisfied, and 2) after the first identification display is performed and before the first period is reached, the first identification display is terminated in accordance with a state in which a condition regarding the viewed position representing a fact that the user keeps gazing is not satisfied.

11. The electronic device according to claim 1, wherein the control unit is further configured to perform control such that, in the line-of-sight detection unit in the second operation mode, 1) a second identification display indicating an area corresponding to a gazing position on a display unit is performed in accordance with a state in which a condition regarding the viewed position representing a fact that gazing has been performed for a fifth period shorter than the second period is satisfied, and 2) after the second identification display is performed and before the second period is reached, the second identification display is terminated in accordance with a state in which a condition regarding the viewed position representing a fact that the user keeps gazing is not satisfied.

12. The electronic device according to claim 1, wherein the electronic device is an imaging device, and the imaging unit is a lens unit included in the electronic device.

13. An electronic device comprising at least one memory and at least one processor which function as:

a line-of-sight detection unit configured to detect a viewed position of a user, and a control unit configured to perform control such that, 1) in a first operation mode, a first function corresponding to a fact that there is gazing is executed in accordance with a state in which a first condition is satisfied in the line-of-sight detection unit, and 2) in a second operation mode, a second function corresponding to a fact that there is gazing is executed in accordance with a state in which a second condition is satisfied in the line-of-sight detection unit, wherein the first condition is a condition regarding the viewed position representing a fact that the user has been gazing for a first period, the second condition is a condition regarding the viewed position representing a fact that the user has been gazing for a second period longer than the first period, the first operation mode is a display mode in which a first number of selectable options are displayed on a display unit, the second operation mode is a display mode in which a second number of selectable options are displayed on the display unit, and the second number larger than the first number.

14. The electronic device according to claim 13, wherein the first function and the second function are functions corresponding to display items displayed at gazing positions among a plurality of display items displayed on a display unit.

15. The electronic device according to claim 14, wherein the first function and the second function are functions for displaying lower hierarchies which are lower than the display items displayed at the gazing positions among the plurality of display items displayed on the display unit.

16. The electronic device according to claim 13, wherein the first operation mode and the second operation mode are operation modes different from an imaging mode for performing imaging using an imaging unit, and are at least one of a reproduction mode for reproducing a recorded image and a setting mode for performing setting of the electronic device.

17. The electronic device according to claim 13, wherein
the control unit is further configured to perform control such that, in a third operation mode, a third function corresponding to a fact that there is gazing is executed in accordance with a state in which a third condition is satisfied in the line-of-sight detection unit,
the third condition is a condition regarding the viewed position representing a fact that the user has been gazing for a third period longer than the second period.

18. The electronic device according to claim 17,
wherein the third operation mode is a display mode in which a third number of selectable options are displayed on the display unit, and
the third number larger than the second number.

19. The electronic device according to claim 18, wherein the second operation mode and the third operation mode are operation modes different from an imaging mode for performing imaging using an imaging unit, and are at least one of a reproduction mode for reproducing a recorded image and a setting mode for performing setting of the electronic device.

20. The electronic device according to claim 13, wherein the control unit is further configured to perform control such that, 1) in the first operation mode, the first function in accordance with a line-of-sight detection result is not executed until continuation of the state in which a condition regarding the viewed position corresponding to a fact that there is gazing is satisfied reaches the first period in the line-of-sight detection unit, and 2) in the second operation mode, the second function in accordance with a line-of-sight detection result is not executed until continuation of the state in which the condition regarding the viewed position corresponding to a fact that there is gazing is satisfied reaches the second period in the line-of-sight detection unit.

21. The electronic device according to claim 13, wherein the control unit is further configured to perform control such that, in the line-of-sight detection unit in the first operation mode, 1) a first identification display indicating an area corresponding to a gazing position on a display unit is performed in accordance with a state in which a condition regarding the viewed position representing a fact that gazing has been performed for a fourth period shorter than the first period is satisfied, and 2) after the first identification display is performed and before the first period is reached, the first identification display is terminated in accordance with a state in which a condition regarding the viewed position representing a fact that the user keeps gazing is not satisfied.

22. The electronic device according to claim 13, wherein the control unit is further configured to perform control such that, in the line-of-sight detection unit in the second operation mode, 1) a second identification display indicating an area corresponding to a gazing position on a display unit is performed in accordance with a state in which a condition regarding the viewed position representing a fact that gazing has been performed for a fifth period shorter than the second period is satisfied, and 2) after the second identification display is performed and before the second period is reached, the second identification display is terminated in accordance with a state in which a condition regarding the viewed position representing a fact that the user keeps gazing is not satisfied.

23. A method of controlling an electronic device including a line-of-sight detection unit configured to detect a viewed position of a user, comprising:
a first controlling step of performing control such that, in a first operation mode, a first function corresponding to a fact that there is gazing is executed in accordance with a state in which a first condition is satisfied in the line-of-sight detection unit; and
a second controlling step of performing control such that, in a second operation mode, a second function corresponding to a fact that there is gazing is executed in accordance with a state in which a second condition is satisfied in the line-of-sight detection unit, wherein
the first condition is a condition regarding the viewed position representing a fact that the user has been gazing for a first period,
the second condition is a condition regarding the viewed position representing a fact that the user has been gazing for a second period longer than the first period, and
the first operation mode is an imaging mode for performing imaging by an imaging unit.

24. A non-transitory computer readable medium that stores a program, wherein the program causes a computer to execute the method of controlling the electronic device according to claim 23.

25. A method of controlling an electronic device including a line-of-sight detection unit configured to detect a viewed position of a user, comprising:
a first controlling step of performing control such that, in a first operation mode, a first function corresponding to a fact that there is gazing is executed in accordance with a state in which a first condition is satisfied in the line-of-sight detection unit; and
a second controlling step of performing control such that, in a second operation mode, a second function corresponding to a fact that there is gazing is executed in accordance with a state in which a second condition is satisfied in the line-of-sight detection unit, wherein
the first condition is a condition regarding the viewed position representing a fact that the user has been gazing for a first period,
the second condition is a condition regarding the viewed position representing a fact that the user has been gazing for a second period longer than the first period,
the first operation mode is a display mode in which a first number of selectable options are displayed on a display unit,
the second operation mode is a display mode in which a second number of selectable options are displayed on the display unit, and
the second number larger than the first number.

26. A non-transitory computer readable medium that stores a program, wherein the program causes a computer to execute the method of controlling the electronic device according to claim 25.

* * * * *